April 19, 1949.   R. E. SEELY   2,467,862
POLYPHASE MOTOR PROTECTIVE MEANS
Filed Jan. 12, 1946
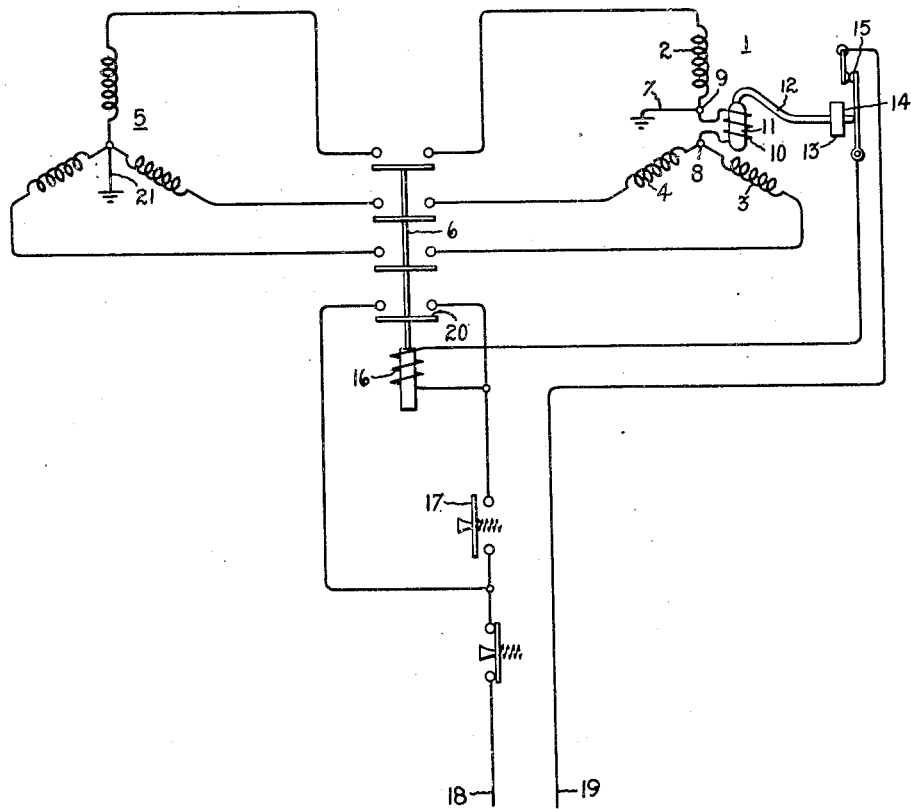
Inventor:
Richard E. Seely,
by Claude A. Pratt.
His Attorney.

Patented Apr. 19, 1949

2,467,862

UNITED STATES PATENT OFFICE 2,467,862

POLYPHASE MOTOR PROTECTIVE MEANS

Richard E. Seely, Fort Wayne, Ind., assignor to General Electric Company, a corporation of New York Application January 12, 1946, Serial No. 640,780

3 Claims. (Cl. 175—294)

My invention relates to electric protective means, more particularly to means for protecting electric apparatus, such as electric motors and the like against abnormally high temperatures caused by an excessive current in the motor winding, and has for its object simple, reliable and inexpensive means for protecting a polyphase motor against both overload and open circuit conditions.

My invention has particular application in the protection of three-phase alternating current motors having a Y-connected stator winding with a grounded neutral connection.

In carrying out my invention in one form I connect current responsive protective means in the circuit of the stator winding between a common connection for two of the windings and the ground connection to which the other winding is connected. As thus connected, the protective device is responsive to overload currents in the winding and is also responsive to excessive or high currents caused by an open circuit in any one of the three windings thereby to protect the motor against open circuit conditions.

For a more complete understanding of my invention, reference should be had to the accompanying drawing, the single figure of which is a diagrammatic representation of a three-phase grounded neutral motor provided with protective means embodying my invention.

Referring to the drawing, I have shown my invention in one form as applied to a three-phase alternating current motor 1 provided with three Y-connected stator windings 2, 3 and 4. The motor is supplied with three-phase current by a suitable alternating current generator 5 to which the motor may be connected by means of a switch 6. The motor is further characterized by a ground connection 7 for the common neutral connection between the three windings 2, 3, and 4. It will be understood that the motor is provided with a rotor having a suitable winding (not shown).

In accordance with my invention I connect current responsive protective means between the common neutral connection point 8 for the windings 3 and 4, and the point 9 connected to the ground connection 7 and to the neutral connection end of the winding 2. In the form shown, this current responsive means comprises a heating resistor 10 connected between the points 8 and 9. This resistor is arranged to heat a bulb 11 forming part of a sealed chamber containing a heat-responsive expansible fluid, the chamber consisting of the bulb 11, a connecting tube 12, and a container 13 having a pressure responsive disk-shaped wall 14 such as described in Patent No. 2,369,986, issued on February 20, 1945 to Edward J. Schaefer. Upon the occurrence of a current of a predetermined high value or a higher value in the resistor 10 the bulb 11 is heated to produce a fluid pressure in the sealed chamber great enough to snap the disk 14 outward to a convex shape whereby a switch 15 is opened thereby to open the circuit of an operating coil 16 for the switch 6.

The switch 6 is closed to start the motor by closing momentarily a normally open push button switch 17, whereby the coil 16 is energized through the switch 15 from the supply mains 18 and 19. The coil 16 closes the switch 6 and at the same time closes an interlock switch 20 in a holding circuit around the push button 17 for the coil 16.

It will be observed that my protective means protects the motor from overheating in the event of an open circuit in any one of the three coils 2, 3, and 4, which open circuit may occur in the coil itself or in the electric connections leading from the generator 5 to the coil. It will be understood that the generator 5 is provided likewise with a three-phase Y-connected winding having a grounded neutral connection 21. Therefore, in the event of an open circuit in any one of the motor windings, current flows between the ground connections 7 and 21. The ground connections are made to a common electrically conducting member which forms an electric connection between the ground connections, such as a common steel support for the two motors.

During normal motor operating conditions with balanced power applied to the three windings 2, 3, and 4, the current through the resistor 10 is equal in value to the current in any one of the three windings and the resistor temperature is responsive directly to the current in the windings, the switch 15 being opened upon the occurrence of a predetermined overload current. When an open circuit occurs in the winding 2, for example, the current in the resistor 10 is equal to the vector sum of the currents in the windings 3 and 4, which is the same as the current in each of the windings. Furthermore, in the event of an open circuit in the winding 3 or the winding 4, the current through the heating resistor 10 is the same as the current in the winding 3 or 4 which is still energized, and also the same as the current in the winding 2, whereby the heating resistor is responsive to the current in the remaining two connected windings.

It will be understood that the heater is directly responsive to the current in the windings under both normal circuit operating conditions and open circuit conditions and, consequently, it operates to protect the motor under all high current conditions.

It will be understood that in the event of an open circuit in any one of the motor windings, the remaining two windings carry an excessively large current, although the motor temperature may not rise as fast as it would with the same high current in all three windings. However, the heater 10 is heated to a predetermined temperature producing the required fluid pressure for operation of the diaphragm 14 and opening of the switch 15 quickly enough to prevent overheating of the motor windings under both operating conditions and open circuit conditions. As a matter of fact, the motor circuit may be opened under open circuit conditions while the motor windings are at a temperature somewhat lower than would exist in the windings in the event of the same current in all three windings under normal operating conditions. This provides a safety factor in the protection against open circuits.

While I have shown a particular embodiment of my invention, it will be understood, of course, that I do not wish to be limited thereto since many modifications can be made, and I therefore contemplate by the appended claims to cover any such modifications as fall within the true spirit and scope of my invention.

What I claim as new and desire to secure by Letters Patent of the United States is:

1. The combination with a motor provided with a stator winding comprising three coils adapted to be connected to a Y-connected grounded neutral source of three-phase alternating current supply, a direct electric connection between one end each of two of said coils, current responsive means connected between said connection and one end of the third of said coils whereby said coils are connected in Y relation, a ground connection for said end of said third coil, and switching means operated by said current responsive means for deenergizing said coils in response to a predetermined high current thereby to protect said motor against open circuit conditions.

2. The combination of a motor provided with three stator coils adapted to be connected to a Y-connected grounded neutral source of three-phase alternating current supply, a direct electric connection between one end each of two of said coils, a heating resistor connected between said connection and one end of the third of said coils whereby said coils are connected in three-phase Y relation, a ground connection for said end of said third coil, and temperature responsive overload protective means for said motor operating in response to the temperature of said heating resistor to open the circuit of said coils and thereby protect said motor against both overload and open circuit conditions.

3. The combination with a motor provided with a three-phase stator winding comprising three coils adapted to be connected to a Y-connected grounded neutral source of three-phase alternating current supply, a direct electric connection between one end each of two of said coils, a heating resistor connected between said connection and one end of the third of said coils whereby said coils are connected in three-phase Y relation, a ground connection for said end of said third coil, switching means for controlling the supply of current to said coils, and operating means for said switching means responsive to the temperature of said resistor to open the circuit of said coils and thereby protect said motor against both overload and open circuit conditions.

RICHARD E. SEELY.

REFERENCES CITED

The following references are of record in the file of this patent:

UNITED STATES PATENTS

| Number | Name | Date |
| --- | --- | --- |
| 1,484,220 | Thamuotila | Feb. 19, 1924 |
| 1,867,417 | Merrick | July 12, 1932 |
| 2,304,599 | Rigby | Dec. 8, 1942 |